(12) United States Patent
Hoffmann

(10) Patent No.: US 10,641,429 B2
(45) Date of Patent: May 5, 2020

(54) TECHNIQUES FOR PROTECTING PIPE COATINGS

(71) Applicant: Acergy France SAS, Suresnes (FR)

(72) Inventor: Philippe Benoit Jacques Hoffmann, Paris (FR)

(73) Assignee: Acergy France SAS, Suresnes (FR)

( * ) Notice: Subject to any disclaimer, the term of this patent is extended or adjusted under 35 U.S.C. 154(b) by 0 days.

(21) Appl. No.: 15/836,288

(22) Filed: Dec. 8, 2017

(65) Prior Publication Data

US 2019/0323647 A1 Oct. 24, 2019

Related U.S. Application Data

(62) Division of application No. 14/396,727, filed as application No. PCT/IB2012/002865 on Dec. 11, 2012, now Pat. No. 9,841,136.

(30) Foreign Application Priority Data

Apr. 24, 2012 (GB) .................................. 1207172.6

(51) Int. Cl.
| | |
|---|---|
| *B29C 45/14* | (2006.01) |
| *F16L 58/18* | (2006.01) |
| *F16L 13/02* | (2006.01) |
| *B32B 38/00* | (2006.01) |

(52) U.S. Cl.
CPC ...... *F16L 58/181* (2013.01); *B29C 45/14336* (2013.01); *B29C 45/14598* (2013.01); *B32B 38/004* (2013.01); *F16L 13/0272* (2013.01); *B29C 45/14622* (2013.01)

(58) Field of Classification Search
None
See application file for complete search history.

(56) References Cited

U.S. PATENT DOCUMENTS

| 4,358,417 | A | * | 11/1982 | Beinhauer | ........... B29C 44/1242 |
| | | | | | 264/36.16 |
| 4,459,251 | A | * | 7/1984 | Eldridge | ............. B29C 44/1219 |
| | | | | | 138/112 |
| 6,099,908 | A | | 8/2000 | Hirano | |
| 6,843,950 | B1 | | 1/2005 | Mally et al. | |
| 9,046,195 | B2 | * | 6/2015 | Hoffmann | ............... B29C 45/04 |
| 10,357,910 | B2 | * | 7/2019 | Hoffmann | |
| 2007/0240780 | A1 | | 10/2007 | Nestegard et al. | |
| 2010/0254687 | A1 | | 10/2010 | George et al. | |
| 2016/0279847 | A1 | | 9/2016 | Hoffmann | |
| 2016/0297125 | A1 | | 10/2016 | Hoffmann | |

FOREIGN PATENT DOCUMENTS

| JP | H 7-139686 | 5/1995 |
| WO | WO 03/095887 | 11/2003 |
| WO | WO 2012/004665 | 1/2012 |

* cited by examiner

*Primary Examiner* — Edmund H Lee
(74) *Attorney, Agent, or Firm* — Levy & Grandinetti

(57) ABSTRACT

A method of protecting a layered coating on a length of pipe for subsea use includes applying an edge finisher to the coating to encase an edge of the coating by fusing the edge finisher with the coating or by moulding the edge finisher at an edge of the coating. Where the coating and the edge finisher are of thermoplastics such as PP, fusing can be achieved by injection moulding the edge finisher or by welding a discrete edge finisher component to the edge of the coating. Mirror welding may be employed for this purpose, with a hot plate being interposed between the edge of the coating and the edge finisher.

13 Claims, 6 Drawing Sheets

TECHNIQUES FOR PROTECTING PIPE COATINGS

This application is a divisional application of U.S. Ser. No. 14/396,727 filed on Oct. 23, 2014, now U.S. Pat. No. 9,841,136, which was a 35 U.S.C. § 371 national phase application of PCT/IB2012/002865 filed on Dec. 11, 2012, which claims priority to British application GB 1207172.6, filed on Apr. 24, 2012.

BACKGROUND OF THE INVENTION

This invention relates to coated pipes as used in the oil and gas industry, and particularly to techniques for protecting the coatings of such pipes.

Pipes used in the oil and gas industry are commonly formed of lengths of steel pipe—'pipe joints'—welded together end-to-end and coated at the resulting field joint as the pipeline is laid. For example, where a pipeline is laid offshore, welding and field joint coating may be performed aboard a pipelaying vessel such as a laybarge that launches the resulting pipe string using S-lay or J-lay methods. It is also common to fabricate a pipe stalk onshore at a spoolbase and to transport the prefabricated pipe offshore for laying in a reel-lay operation, in which welded pipe stalks are stored in a compact spooled form on a pipelaying vessel.

To mitigate corrosion of the pipeline and optionally also to insulate the fluids that the pipeline carries in use, the pipe lengths are pre-coated with protective coatings that, optionally, are also thermally insulating. Many variations are possible in the structure and composition of the coating to obtain the required protective or insulative properties. However, polypropylene (PP) is most commonly used to coat the pipe lengths from which pipelines are made. For example, a three-layer PP (3LPP) coating may be used for corrosion protection and scratch protection and a five-layer PP (5LPP) coating may be used for additional thermal insulation. Additional layers are possible; for example, a seven-layer PP (7LPP) coating may be used where thermal insulation requirements are particularly stringent.

A 3LPP coating typically comprises a fusion-bonded epoxy (FBE) primer applied to the cleaned outer surface of a length of steel pipe. As the primer cures, a second thin layer of PP is applied so as to bond with the primer and then a third, thicker layer of extruded PP is applied over the second layer for mechanical protection. A 5LPP insulation coating typically comprises a succession of PP layers above the FBE primer, those layers being alternately of solid PP and foamed PP with the uppermost layer being of solid PP for mechanical protection of the insulation. A 7LPP insulation coating adds to the 5LPP coating another two layers, namely a sixth layer of foamed PP for additional thermal insulation surrounded by a seventh layer of extruded solid PP for mechanical protection of the insulating sixth layer.

During manufacture of a 5LPP or 7LPP insulation-coated pipe, the coating is laid onto the pipe in a factory by known methods such as wrapping or extrusion. For example, lengths of pipe (typically 12 meters in length) that will form pipe joints may be positioned end-to-end to form an apparently continuous pipe that is then coated on a coating line. At the end of the coating line, the pipe lengths are separated from each other by cutting through the insulation coating.

Later in the same factory, or elsewhere, the edge of the 5LPP or 7LPP insulation coating is cut back from the end of each pipe length and may also be chamfered or bevelled. This leaves a short end portion of pipe with just the FBE anti-corrosion coating at each end of a pipe length to facilitate welding on board a pipelaying vessel for S-lay or J-lay operations or at a spoolbase for reel-lay operations.

The extremity of the pipe is protected temporarily with a plastics end cap that closes the pipe end to protect the interior of the pipe from dust and corrosion. Similarly, once the edge of the 5LPP or 7LPP insulation coating has been cut back, chamfered or bevelled, that edge is protected temporarily by a film tape to protect the edge of the coating—and especially the foamed layers of the coating—from dust and moisture.

The end cap and the film tape are removed as part of the preparations for welding and for field joint coating.

Reference is now made to FIGS. 1 to 3 of the accompanying drawings to illustrate this prior art.

The end caps 16, 18 shown in FIGS. 2 and 3 each comprise a recessed circular central wall 20 surrounded by an annular C-section channel 22 comprising an inner wall 24, an outer wall 26 and an end wall 28. The inner and outer walls 24, 26 are concentrically curved and spaced apart to embrace an edge of the pipe length 10 with a resilient sliding fit that holds the end caps 16, 18 in place by friction. The depth of the inner and outer walls 24, 26 is slightly less than the length of the end portion 30 of the pipe length 10, hence being deeper in the end cap 18 of FIG. 3 where the end portion is longer. This greater depth also helps to secure the end cap 18 against being lost from the end of the pipe length 10 during storage, handling and transportation.

Coated pipe lengths 10 are typically kept in storage or in transit for an extended period before being welded into a pipeline. That period may extend from a few weeks or months to more than a year. During that time, the pipe lengths 10 may be stored outside in harsh, wet or humid environments and may be handled roughly while being transported between various locations. This may damage, or even cause loss of, the temporary protection in the form of the end caps 16, 18 and the film tape 17 applied to the end portion of the pipe length 10 and to the cut edge 14 of the coating 12.

Where end caps 16, 18 are used, they protect the extremity of the pipe length 10 for as long as they remain in place. However, the film tape 17 provides less protection for the cut edge 14 of the coating 12, where the foamed PP layers of the 7LPP structure are not protected by the surrounding solid PP layers as intended. Consequently, during storage, handling and transportation, moisture and dust can penetrate into the foamed PP layers, creating a weak point for future bonding with the field joint coating that is applied between pipe lengths after welding.

Weak bonding introduces a risk that cracks may occur at the interface between the pipe coating and the field joint coating. Any such cracks may allow water to reach the outer surface of the pipe in use, thus corroding the pipe. Water ingress may also reduce the adhesion of the coating to the pipe and may additionally degrade the coating. Clearly, degradation or loss of adhesion of the coating will tend to permit further corrosion of the pipe and may also reduce its thermal insulation. In this respect. a particular problem that may be suffered by a field joint coating of cast-moulded polyurethane (CMPU) is hydrolysis of the PU under heat emanating from within the pipeline in use. The risk of hydrolysis is particularly significant under the high-pressure conditions of deep water.

SUMMARY OF THE INVENTION

Against this background, the invention resides in a method of protecting a 5LPP or 7LPP coating comprising alternating layers of solid and foamed polypropylene on a discrete pipe joint for subsea use, the method comprising applying a protective edge finisher of thermoplastics to a cut edge of the coating to encase the cut edge of the coating, heat being applied to melt the thermoplastics of the edge finisher and the polypropylene of the coating at their interface to fuse the edge finisher with the coating.

For example, the edge finisher may be formed by injection moulding at the edge of the coating, in which case the edge of the coating is preferably heated before injection moulding forms the edge finisher. Alternatively, the edge finisher may be a discrete component welded to the edge of the coating, for example by mirror-welding.

Mirror-welding may employ a hot plate interposed between the edge of the coating and the edge finisher that is withdrawn after melting facing surfaces of the edge of the coating and the edge finisher before the edge finisher is pressed against the edge of the coating while those facing surfaces are still molten. The hot plate may be withdrawn radially with respect to a central longitudinal axis of the length of pipe to provide clearance for the edge finisher to be pressed against the edge of the coating.

Thus, the inventive concept encompasses a mirror-welding apparatus for welding an edge finisher to an edge of a coating on a length of pipe for subsea use, the apparatus comprising: a movable hot plate arranged to be interposed between the edge of the coating and the edge finisher and to be withdrawn after melting facing surfaces of the edge of the coating and the edge finisher; and a press member for pressing the edge finisher against the edge of the coating while those facing surfaces are still molten. The hot plate may be movable radially with respect to a central longitudinal axis of the length of pipe to provide clearance for the edge finisher to be pressed against the edge of the coating. For example, the hot plate may be divided into circumferentially-adjacent segments that, when brought together, define an annulus for encircling the length of pipe.

The invention may also be expressed as a method of protecting a layered coating on a length of pipe for subsea use, the method comprising applying a protective edge finisher to the coating by injection-moulding the edge finisher at an edge of the coating, for example from a thermoplastics or thermoset material, to encase the edge of the coating before the length of pipe is stored or transported to a welding location at which fabrication of a pipeline takes place.

Where moulding is employed to create the edge finisher in situ, the method of the invention suitably comprises applying a mould tool to the length of pipe while leaving an inner wall of the mould tool spaced from the edge of the coating to define a mould chamber between that wall and the edge of the coating. Where the edge of the coating is bevelled, the inner wall of the mould tool is suitably frusto-conical. The mould tool may be sealed on an outer side to the coating and on an inner side to the length of pipe.

The inventive concept therefore extends to a mould tool for moulding an edge finisher at an edge of a coating on a length of pipe for subsea use, the mould tool comprising an annular wall to define a mould cavity between the wall and the edge of the coating, an outer seal on an outer side of the annular wall for sealing against the coating and an inner seal on an inner side of the annular wall for sealing against the length of pipe. The annular wall of the mould tool may be stepped such that the edge finisher comprises an annular flange extending longitudinally with respect to a length of pipe on which the edge finisher is moulded. In this respect, an end cap as used in the prior art may be affixed to the length of pipe or to the edge finisher, either to a portion of the discrete pipe joint outboard of the edge finisher or to a protruding flange part of the edge finisher itself.

The edge finisher may be machined before welding the length of pipe to a pipe string, either to skim the edge finisher or to remove the edge finisher entirely. Where the edge finisher remains, field joint coating may take place after welding the length of pipe to a pipe string such that the field joint coating is joined to the edge finisher.

The inventive concept extends to a coated length of pipe for subsea use, having an edge finisher moulded or attached to the coating by the methods of the invention. The inventive concept also embraces a length of pipe for subsea use having a layered coating of thermoplastics, further comprising an edge finisher of thermoplastics fused to the coating and encasing an edge of the coating or an edge finisher moulded at an edge of the coating to encase the edge of the coating.

In summary, in accordance with the invention, a technique for protecting a layered coating on a length of pipe for subsea use comprises applying an edge finisher to the coating to encase an edge of the coating. This may be achieved by fusing the edge finisher with the coating or by moulding the edge finisher at an edge of the coating. Where the coating and the edge finisher are of thermoplastics such as PP, fusing may be achieved by injection moulding the edge finisher or by welding a discrete edge finisher component to the edge of the coating. Mirror welding may be employed for this purpose, with a hot plate being interposed between the edge of the coating and the edge finisher.

In preferred embodiments, the invention applies a thick layer of solid PP onto the cut edge of a pipe coating soon after the coating is cut, preferably within a maximum of a few hours and most preferably within the same manufacturing facility that coats the pipe. The layer of solid PP is bonded or welded to the edge of the coating by applying heat to melt the components at their interface and to ensure proper adhesion by fusion. This operation can be performed before the coating is cut back at the end of the pipe length, or just after.

The edge protection of the invention is removed or skimmed by machining at the welding site, just before welding takes place—preferably not more than one hour, or at most a few hours, before welding.

The invention solves the problem of protecting the edge of the coating by providing an edge finisher that is tough and reliable and cannot be removed accidentally or lost because it adheres properly to the coating. As a result, the vulnerable foamed layers of the PP coating are no longer exposed to moisture and dust during storage, handling and transportation.

BRIEF DESCRIPTION OF THE DRAWINGS

Reference has already been made to FIGS. 1 to 3 of the accompanying drawings to illustrate the prior art. In order that the invention may be more readily understood, reference will now be made, by way of example, to FIGS. 4 to 7d of the drawings, in which.

DETAILED DESCRIPTION OF THE INVENTION

Figure 1:
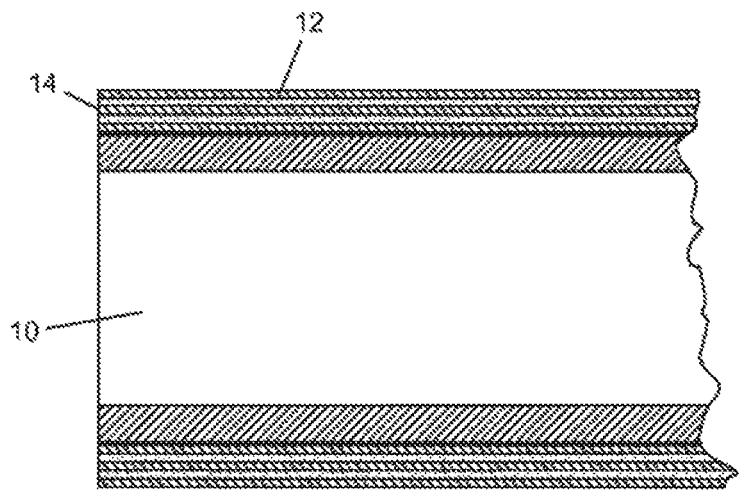
FIG. 1 is a sectional side view of a prior art pipe length 10 for subsea use, having just been separated from an adjoining pipe length after the application of a 7LPP coating 12 and having a cut edge 14 flush with an end of the pipe length 10.
Figure 2:
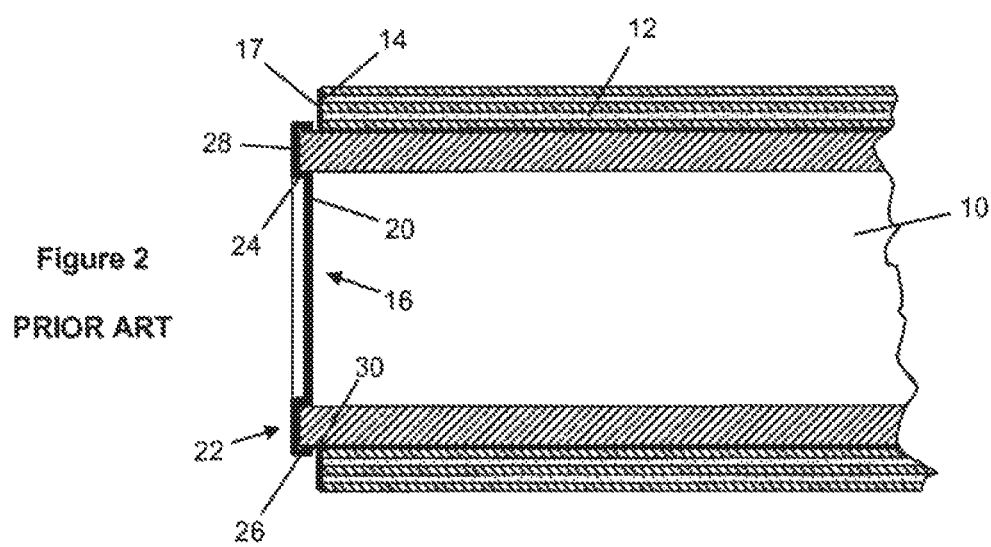
FIG. 2 is a sectional side view of a prior art pipe length 10 coated with a 7LPP coating 12, the coating 12 in this example having a cut edge 14 inset slightly from an end of the pipe length 10, with a shallow end cap 16 fitted to that end and a film tape 17 applied to the cut edge 14.
Figure 3:
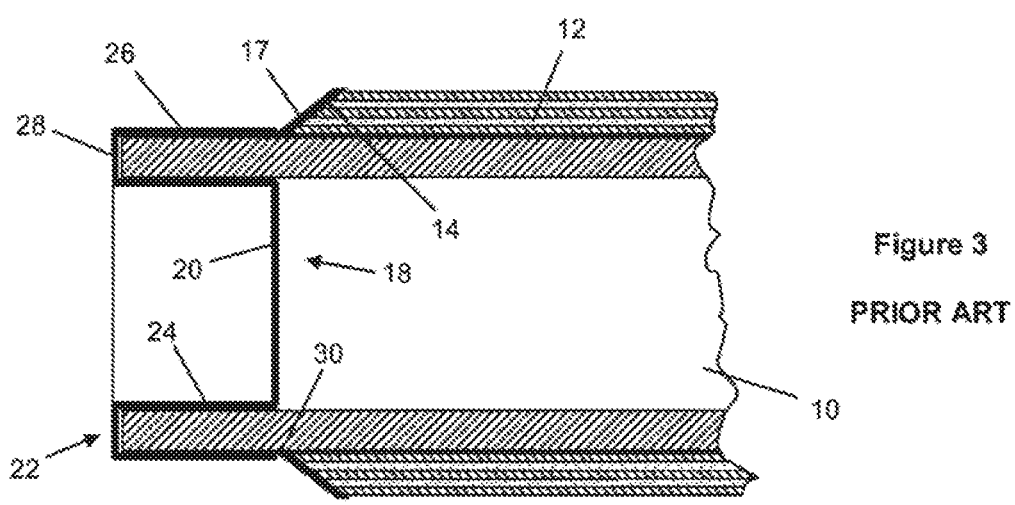
FIG. 3 is a sectional side view of a prior art pipe length 10 coated with a 7LPP coating 12, the coating 12 in this example being cut back further from an end of the pipe length 10 and being bevelled at its cut edge 14, with a deep end cap 18 fitted to that end and a film tape 17 applied to the bevelled cut edge 14.

In FIGS. 4 to 7d, reference numerals used in FIGS. 1 to 3 are retained for like parts. Thus, each figure shows a pipe length 10 coated with a 7LPP coating 12 that has a cut edge 14. Also, some of FIGS. 4 to 7d include a shallow end cap 16 and others include a deep end cap 18. These show how the invention can be used in conjunction with familiar forms of pipe protection, hence minimising changes in existing working practices.

Figure 4A:
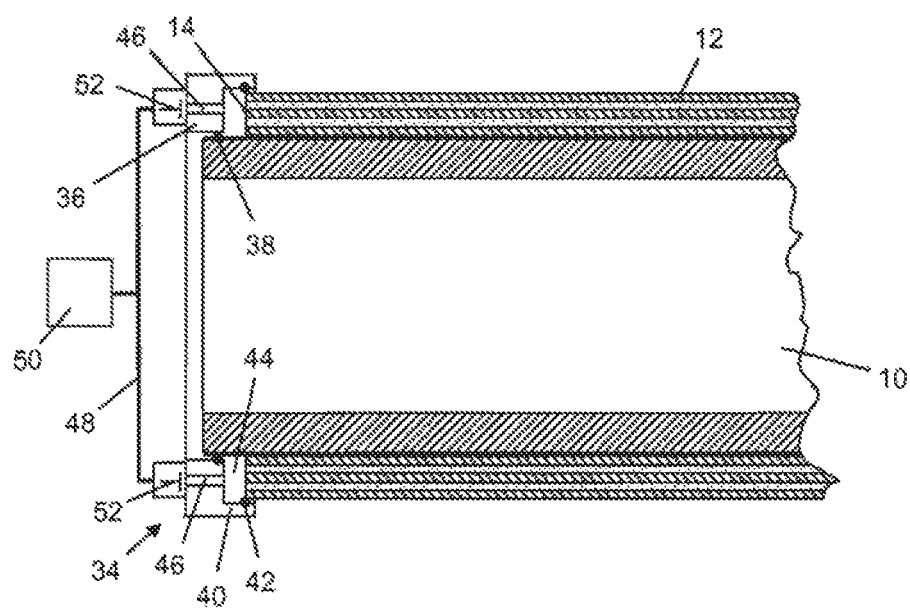
FIG. 4a is a sectional side view of a 7LPP-coated pipe length undergoing edge-finishing of the coating in accordance with the invention, the coating in this example having been cut back slightly from an end of the pipe length.
Figure 4B:
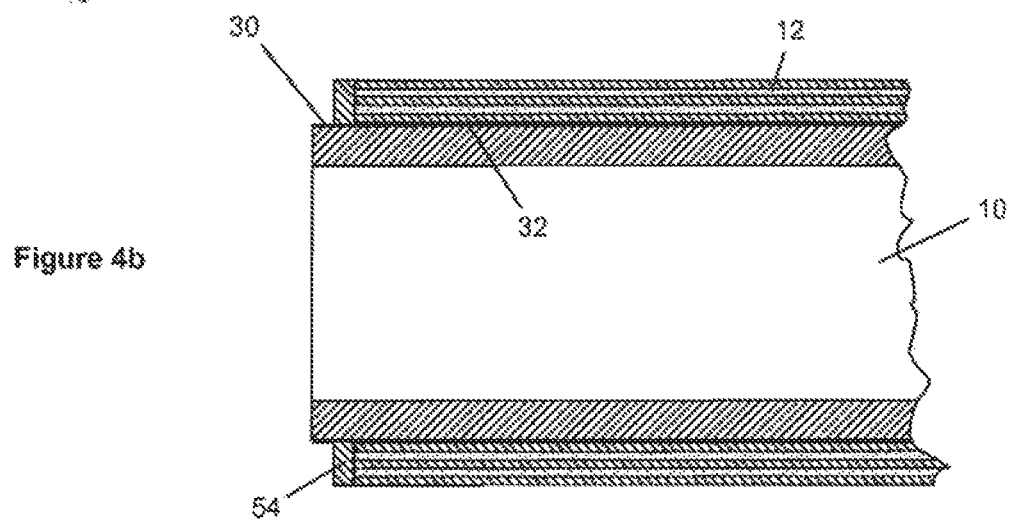
FIG. 4b corresponds to FIG. 4a and shows an edge finisher of the coating in place.
Figure 4C:
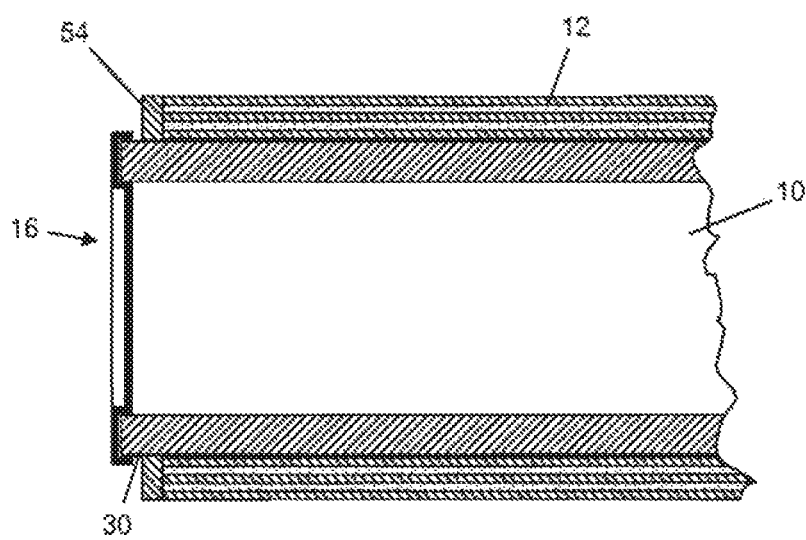
FIG. 4c corresponds to FIG. 4b and shows a shallow end cap fitted to the edge-finished end of the pipe length.

Referring firstly to FIGS. 4a to 4c, these show a 7LPP-coated pipe length 10 in which the coating 12 has been cut back slightly from an end of the pipe length 10 to leave an uncoated end portion 30. The coating 12 will generally be removed completely along the uncoated portion 30, although a thin layer of PP could possibly remain. However, the uncoated portion 30 will generally retain a layer of fusion-bonded epoxy (FBE) 32 over the underlying steel wall of the pipe length 10.

FIG. 4a shows the cut edge 14 covered by an annular mould tool 34 fixed around the pipe length 10. The mould tool 34 has an end wall 36 that seats against the uncoated portion 30 of the pipe length 10 via an inner seal 38, and an outer skirt 40 that seats against the coating 12 via an outer seal 42. The end wall 36 is spaced from the coating 12 to define an annular mould cavity 44 between the coating 12 and the mould tool 34.

The end wall 38 of the mould tool 34 is penetrated by gates 46 for injecting molten PP into the mould cavity 44. The molten PP is supplied through a feed line 48 under pressure from a supplying reservoir or machine 50. Valves 52 associated with the respective gates 46 may be opened simultaneously or sequentially, for example in a cascade arrangement, to fill the mould cavity 44 in any desired manner under manual or automatic control.

Before the mould tool 34 is fixed in place so that the injection moulding operation can begin, the cut edge 14 of the coating 12 is cleaned and heated, for example using gas flames. This activates its PP surface to ensure a good join with the molten PP that will be injected into the mould cavity 44 when the mould tool 34 is fixed in place.

After the mould cavity 44 has been filed and once the molten PP in the mould cavity 44 has cooled and solidified to a self-supporting extent, the mould tool 34 is removed to leave an injection-moulded edge finisher 54 attached to the cut edge 14 of the coating 12 as shown in FIG. 4b. The edge finisher 54 is fused with the PP of the coating 12 at the cut edge 14 and also adheres to the FBE layer 32 (or to any PP layer that may be left on the uncoated portion 30) so as to provide no routes for ingress of moisture or dust to the internal layers of the coating 12. The edge finisher 54 is so firmly attached to the coating 12 that it cannot accidentally be knocked off during handling and transportation; also, its thickness helps to protect the cut edge 14 of the coating 12 against mechanical damage.

FIG. 4c shows how the edge finisher 54 may be inset from the end of the pipe length 10 to allow a prior art end cap 16 (as shown in FIG. 2) to be fitted for additional protection of the pipe length 10. The pipe length 10 is then ready for storage and transportation.

Figure 5A:
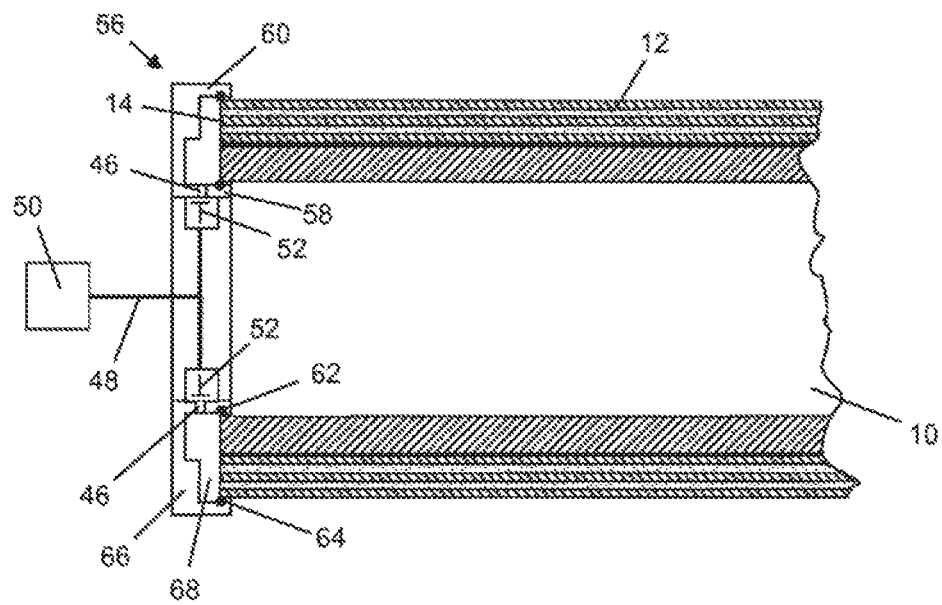
FIG. 5a is a sectional side view of a 7LPP-coated pipe length undergoing edge-finishing of the coating in accordance with the invention, the coating in this example being flush with the end of the pipe length.
Figure 5B:
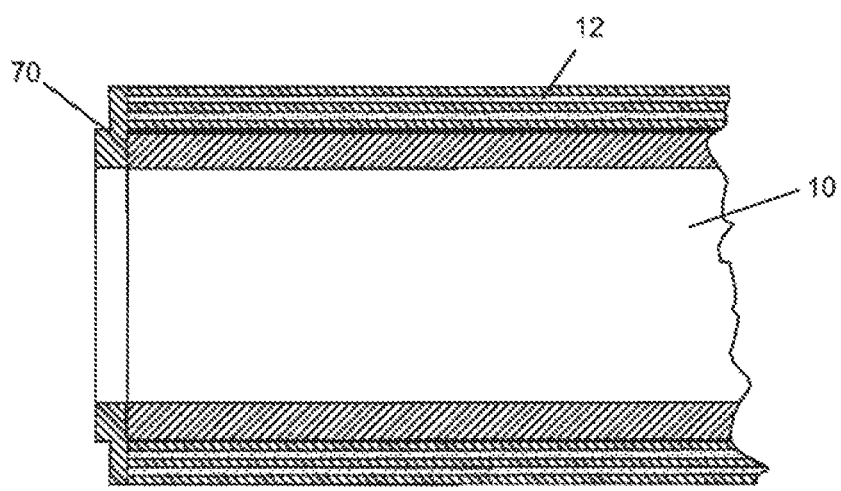
FIG. 5b corresponds to FIG. 5a and shows an edge finisher of the coating in place, overlying the end of the pipe length.
Figure 5C:
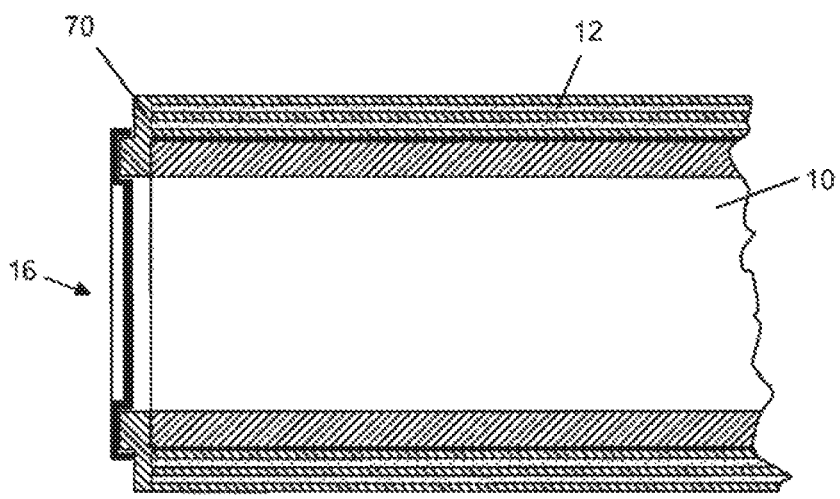
Figure 5c corresponds to FIG. 5b and shows a shallow end cap fitted to the edge finisher.

Moving on now to FIGS. 5a to 5c, this variant has a 7LPP-coated pipe length 10 in which the coating 12 is not cut back to leave an uncoated portion; instead its cut edge 14 remains flush with an end of the pipe length 10. Consequently, the mould tool 56 shown in FIG. 5a differs from the mould tool 34 of FIG. 4a by virtue of inner and outer skirts 58, 60 that are concentrically curved and spaced apart to embrace the combined thickness of the pipe length 10 including the coating 12. The inner skirt 58 has an inner seal 62 that seats against the inner end edge of the pipe length 10 and the outer skirt 60 has an outer seal 64 that seats against the outer end edge of the coating 12.

The mould tool 56 further comprises a stepped end wall 66 between the inner and outer skirts 58, 60. The end wall 66 is spaced further from the pipe length 10 than from the coating 12, to define a correspondingly stepped mould cavity 68 whose step aligns with the junction between the pipe length 10 and the coating 12.

As in FIG. 4a, the mould tool 56 has gates 46 for injecting molten PP into the mould cavity 44, supplied through a feed line 48 under pressure from a supplying reservoir or machine 50 and controlled by valves 52.

After the mould cavity 68 has been filled and once the molten PP in the mould cavity 68 has cooled and solidified to a self-supporting extent, the mould tool 56 is removed to leave an injection-moulded edge finisher 70 attached to the cut edge 14 of the coating 12 and overlying an end of the pipe length 10 as shown in FIG. 5b. The edge finisher 70 has a stepped end profile with an inner circumferential flange extending longitudinally in alignment with the steel wall of the pipe length 10. This mimics the inset of the edge finisher 54 shown in FIG. 4c that allows a prior art end cap 16 (as shown in FIG. 2) to be fitted for additional protection of the pipe length 10 as shown in FIG. 5*c*. The pipe length 10 is then ready for storage and transportation.

Figure 6A:
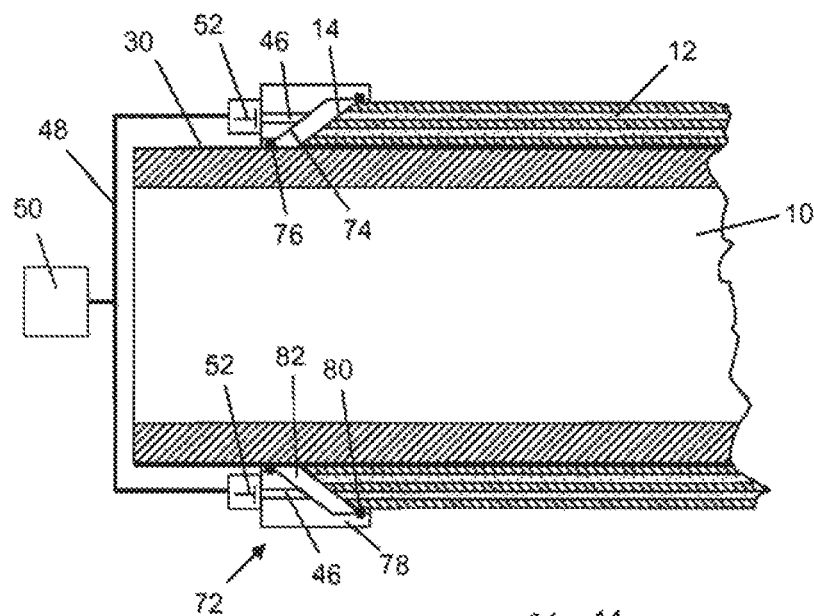
FIG. 6a is a sectional side view of a 7LPP-coated pipe length undergoing edge-finishing of the coating in accordance with the invention, the coating in this example being cut back appreciably from an end of the pipe length and bevelled at its cut edge.
Figure 6B:
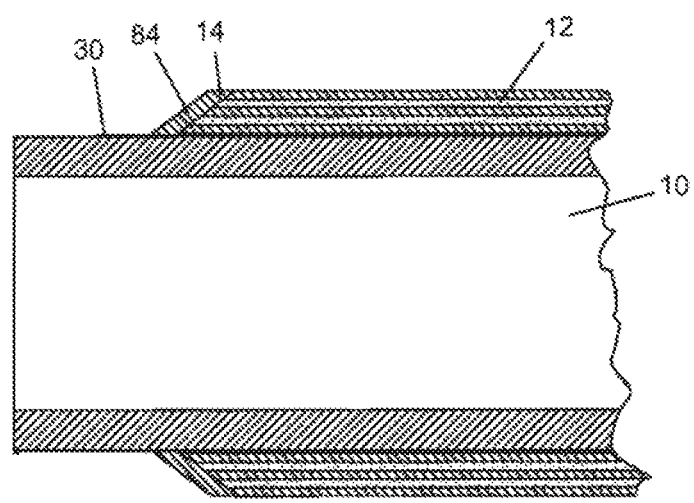
FIG. 6b corresponds to FIG. 6a and shows an edge finisher of the coating in place.
Figure 6C:
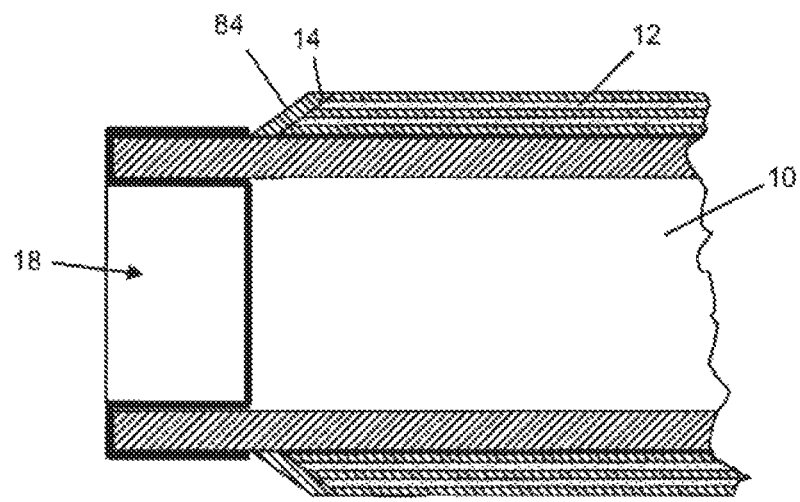
FIG. 6c corresponds to FIG. 6b and shows a deep end cap fitted to the edge-finished end of the pipe.

FIGS. 6*a* to 6*c* show a 7LPP-coated pipe length 10 whose coating 12 is cut back appreciably from an end of the pipe length 10 to create a long uncoated portion 30. Also, the coating 12 is bevelled at its cut edge 14.

FIG. 6*a* shows a mould tool 72 adapted to suit the bevelled cut edge 14 of the coating 12. The mould tool 72 has a end wall 74 with a frusto-conical inner surface that seats against the uncoated portion 30 of the pipe length 10 via an inner seal 76, and an outer skirt 78 that seats against the coating 12 via an outer seal 80. The end wall 36 is spaced from the cut edge 14 of the coating 12 to define an annular mould cavity 82 between the coating 12 and the mould tool 34.

As in FIGS. 4*a* and 58, the mould tool 72 has gates 46 for injecting molten PP into the mould cavity 44, supplied through a feed line 48 under pressure from a supplying reservoir or machine 50 and controlled by valves 52.

After the mould cavity 82 has been filled and once the molten PP in the mould cavity 82 has cooled and solidified to a self-supporting extent, the mould tool 72 is removed to leave an injection-moulded edge finisher 84 attached to the cut edge 14 of the coating 12 and encircling the uncoated portion 30 of the pipe length 10 as shown in FIG. 6*b*. The edge finisher 84 is inset sufficiently from the end of the pipe length 10 that a deep end cap 18 of the prior art (as shown in FIG. 3) can be fitted for additional protection of the pipe length 10 as shown in FIG. 6*c*. The pipe length 10 is then ready for storage and transportation.

The mould tools 34, 56, 72 shown in FIGS. 4*a*, 5*a* and 6*a* are of circular cross-section and in one piece, and can simply be pressed against the end of the pipe length 10 for sealing engagement with pipe length 10 and with the coating 12. Alternatively, the mould tools 34, 56, 72 may be divided longitudinally into two or more segments to be assembled around the end of the pipe length 10, with an inward clamping action being appropriate for the mould tools 34, 72 shown in FIGS. 4*e* and 6*a*.

In practice, the mould tools 34, 56, 72 shown in FIGS. 4*a*, 5*a* and 6*a* will have one or more vents to allow air to escape as the mould cavity fills with molten PP. A cooling system may also be provided, comprising a water jacket created by water pipes disposed in or on the walls of the mould tool. Also, the mould cavity may be oversized to allow for shrinkage as the PP cools. These details will be well understood by those skilled in the art of injection moulding and so have been omitted from the drawings for clarity.

Turning finally to FIGS. 7*a* to 7*d*, these show another approach to fusing an edge finisher 86 to a cut edge 14 of a coating 12 on a pipe length 10. Here, the edge finisher 86 is pre-moulded or pre-cut, in this case as a flat ring of PP that is mirror-welded to the cut edge 14 of the coating 12. An interposed annular hot plate 88 melts the facing surfaces of the edge finisher 86 and the cut edge 14 before the hot plate 88 is withdrawn to allow the edge finisher 86 to be pressed against the cut edge 14 to fuse with it.

Figure 7A:
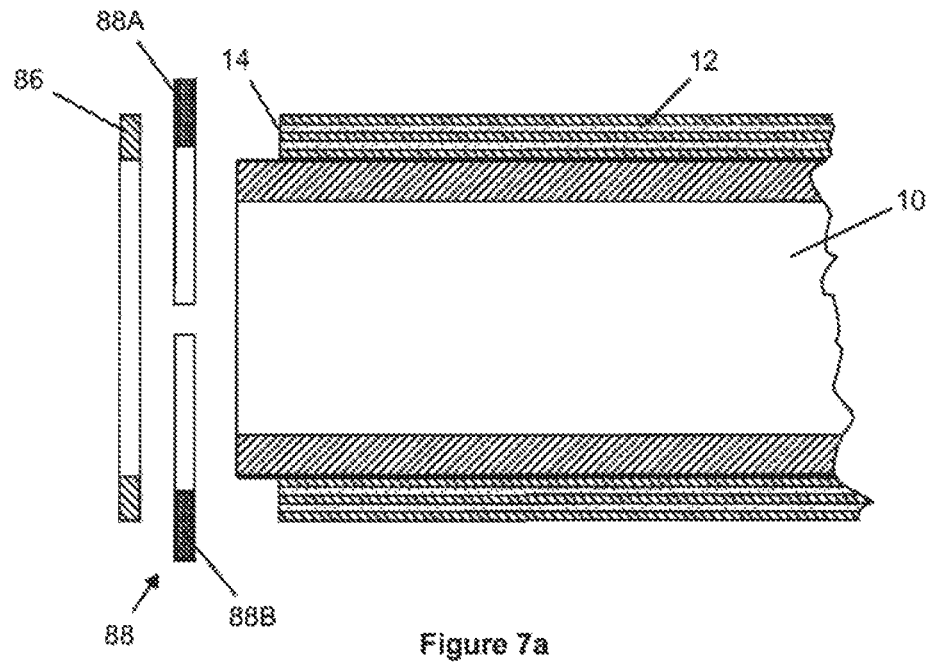
FIGS. 7a, 7b, 7c and 7d are a sequence of sectional side views of a 7LPP-coated pipe length undergoing edge-finishing of the coating in accordance with the invention, edge-finishing in this example being achieved by fusing an edge finisher to a cut edge of the coating.

FIG. 7*a* is an exploded view that, like FIG. 4*a*, shows the coating 12 cut back slightly from an end of the pipe length 10 to leave a short uncoated portion 30. FIG. 7*a* shows the edge finisher 86 as a continuous ring and the hot plate 88 as a segmented ring whose segments 88A, 88B are movable radially together and apart. Two semi-circular segments 88A, 888 are shown here for simplicity but there could be three, four or more segments. When its segments 88A, 88B have been brought together, the ring then defined by the hot plate 88 has an internal diameter matching the outer diameter of the uncoated portion 30. The edge finisher ring 86 also has an internal diameter matching the outer diameter of the uncoated portion 30.

Figure 7B:
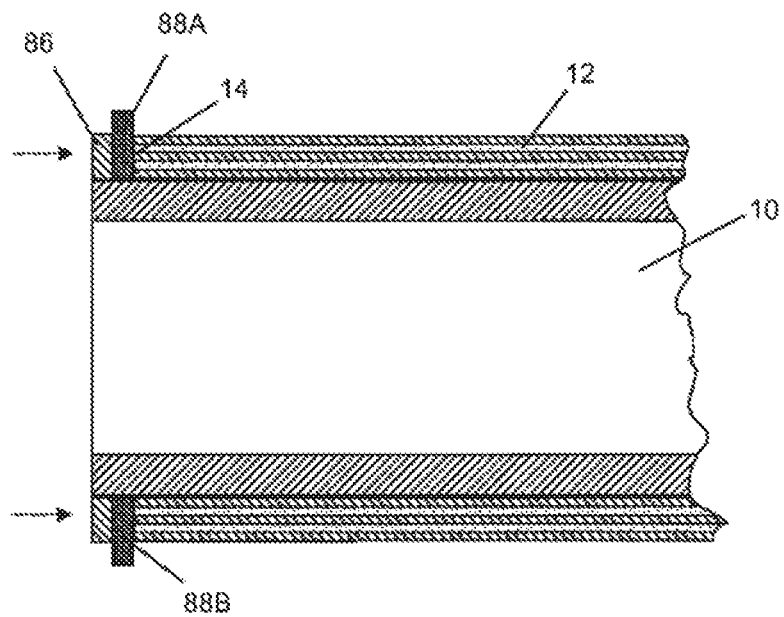

With its segments 88A, 88B brought together around the uncoated portion 30, the inboard face of the hot plate 88 is placed against the cut edge 14 of the coating 12. The edge finisher ring 86 is then placed onto the uncoated portion 30 and pressed against the outboard face of the hot plate 88. The hot plate 88 thus interposed between the edge finisher ring 86 and the cut edge 14 is heated electrically or inductively to melt the facing surfaces of the edge finisher ring 86 and the cut edge 14 as shown in FIG. 7*b*.

Figure 7C:
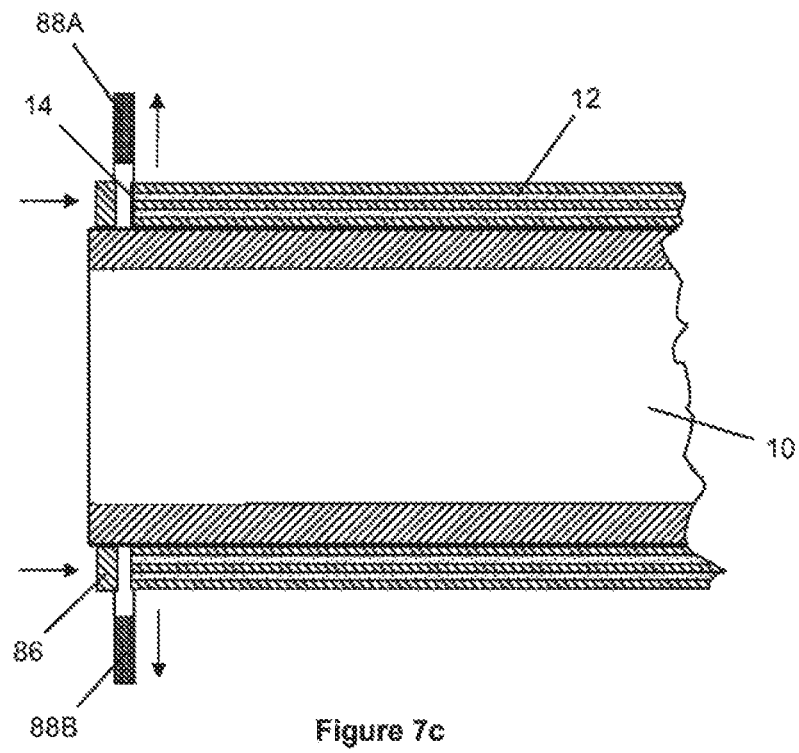

FIG. 7*c* shows the segments 88A, 888 of the hot plate 88 pulled radially apart to provide clearance for the edge finisher ring 86 to slide inboard along the uncoated portion 30 toward the cut edge 14 of the coating 12. The edge finisher ring 86 bears against the cut edge 14 while their facing surfaces remain molten, whereupon continued inboard pressure on the edge finisher ring 86 as shown in FIG. 7*d* effects a weld between the edge finisher ring 86 and the cut edge 14.

Figure 7D:
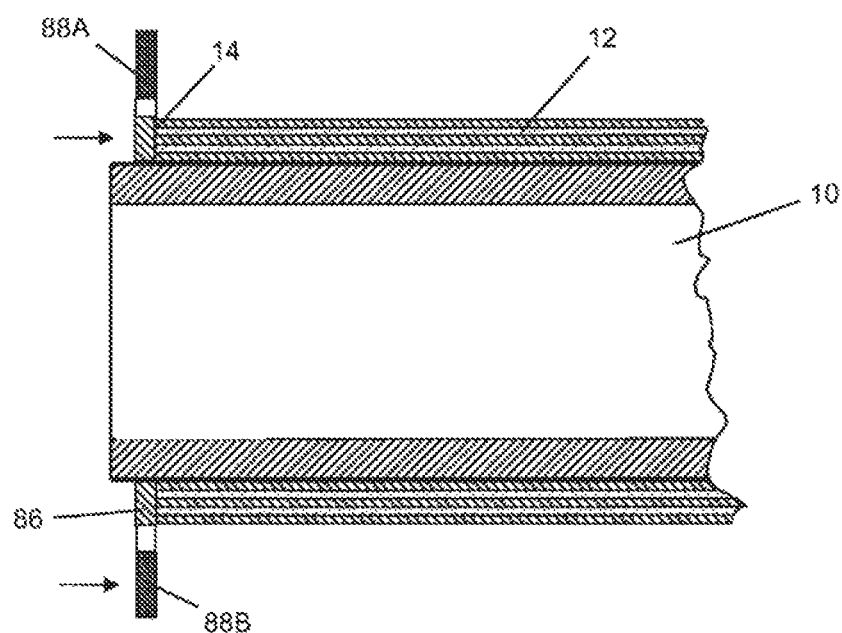

Although not shown in FIG. 7*d*, it will be clear that the inset of the edge finisher ring 86 from the end of the pipe length 10 will allow a prior art end cap 16 (as shown in FIG. 2) to be fitted for additional protection of the pipe length 10 before storage and transportation.

When a pipe length prepared in accordance with the invention is at a welding location at which fabrication of a pipeline takes place, any end cap is removed and the end of the pipe length is prepared for welding. This preparation will typically involve machining the edge finisher away as part of cutting back and optionally bevelling the coating to make space for welding and subsequent field joint coating operations. However, in principle, the edge finisher could remain in place if it is cleaned, for example by skimming off an outer layer.

Where the edge finisher is of PP and remains in place, this makes the present invention particularly suitable for use in conjunction with injection moulding of PP (IMPP) to form a field joint coating, as described in our co-pending application WO 2012/004665. The pipe coating, the edge finisher and the field joint coating are sufficiently compatible that they fuse together at their mutual interfaces, resisting cracking and hence giving longer service life. The use of PP for the edge finisher and for the field joint coating allows the same, or compatible, coating materials to extend all along the length of the pipe string, to maintain broadly similar mechanical and thermal properties. The service temperature of PP is also markedly higher than PU.

Whilst PP is much preferred over PU for the edge finisher for these reasons, in principle it would be possible to form an edge finisher using another thermoplastic or even a thermoset material such as cast-moulded polyurethane (CMPU), particularly if the edge finisher is to be removed entirely before welding and forming a field joint coating. In this case, the reduction in bond strength between the pipe coating and the edge finisher due to the dissimilarity between PP and PU is less critical than when the pipeline is in service.

The invention claimed is:

1. A method of protecting a 5LPP or 7LPP coating comprising alternating layers of solid and foamed polypropylene on a discrete pipe joint for subsea use, the method comprising applying a protective edge finisher of thermoplastics to a cut edge of the coating to encase the cut edge of the coating, heat being applied to melt the thermoplastics of the edge finisher and the polypropylene of the coating at their interface to fuse the edge finisher with the coating, before the discrete pipe joint is transported to a welding location at which fabrication of a pipeline takes place by welding the discrete pipe joint to another discrete pipe joint.

2. The method of claim 1, wherein the edge finisher is formed by injection moulding at the edge of the coating.

3. The method of claim 2, wherein the edge of the coating is heated before injection moulding forms the edge finisher.

4. The method of claim 1, comprising applying a mould tool to the discrete pipe joint while leaving an inner wall of the mould tool spaced from the edge of the coating to define a mould chamber between that wall and the edge of the coating.

5. The method of claim 1, wherein the edge finisher is a discrete component welded to the edge of the coating.

6. The method of claim 5, wherein the edge finisher is mirror-welded to the edge of the coating.

7. The method of claim 6, wherein a hot plate interposed between the edge of the coating and the edge finisher is withdrawn after melting facing surfaces of the edge of the coating and the edge finisher before the edge finisher is pressed against the edge of the coating while those facing surfaces are still molten.

8. The method of claim 7, wherein the hot plate is withdrawn radially with respect to a central longitudinal axis of the discrete pipe joint to provide clearance for the edge finisher to be pressed against the edge of the coating.

9. The method of claim 1, followed by affixing an end cap to the discrete pipe joint or to the edge finisher.

10. The method of claim 9, wherein the end cap is affixed to a portion of the discrete pipe joint outboard of the edge finisher.

11. The method of claim 9, wherein the end cap is affixed to a protruding part of the edge finisher.

12. The method of claim 1, followed by machining the edge finisher before welding the discrete pipe joint to a pipe string.

13. The method of claim 1, followed by field joint coating after welding the discrete pipe joint to a pipe string such that the field joint coating is joined to the edge finisher.

* * * * *